United States Patent [19]

Hynd

[11] 4,011,070
[45] Mar. 8, 1977

[54] METHOD AND APPARATUS FOR REGULATING MOLTEN GLASS FLOW INTO A CONDITIONING CHAMBER

[75] Inventor: William Christie Hynd, Lymm, England

[73] Assignee: Pilkington Brothers Limited, St. Helens, England

[22] Filed: Oct. 3, 1975

[21] Appl. No.: 619,160

[30] Foreign Application Priority Data

Oct. 22, 1974 United Kingdom ............. 45701/74

[52] U.S. Cl. .................................... 65/29; 65/135; 65/162; 65/164; 65/341
[51] Int. Cl.² ......................................... C03B 5/24
[58] Field of Search ............. 65/29, 135, 136, 164, 65/162, 341

[56] References Cited

UNITED STATES PATENTS

| | | |
|---|---|---|
| 1,646,705 | 10/1927 | Peiler ................................. 65/164 |
| 1,872,664 | 8/1932 | Brown ............................. 65/341 X |
| 1,920,747 | 8/1933 | Hatch ................................. 65/164 |
| 3,244,494 | 4/1966 | Apple et al. ......................... 65/136 |
| 3,730,695 | 5/1973 | Varrasso ........................... 65/29 X |

Primary Examiner—Arthur D. Kellogg
Attorney, Agent, or Firm—Sughrue, Rothwell, Mion, Zinn & Macpeak

[57] ABSTRACT

A predetermined rate of flow of molten glass from a reservoir, for example a glass melting furnace, is maintained by flowing glass from the reservoir to an intermediate vessel in which the glass temperature is fixed in relation to the temperature of glass discharging from the reservoir, continuously developing a control signal representing any change in the quantity of glass in the intermediate vessel, and using that signal to adjust the flow from the reservoir.

24 Claims, 5 Drawing Figures

METHOD AND APPARATUS FOR REGULATING MOLTEN GLASS FLOW INTO A CONDITIONING CHAMBER

BACKGROUND OF THE INVENTION

1. Field of the Invention

This invention relates to glass manufacture and in particular to the control of the rate of flow of molten glass from a reservoir, for example a glass melting furnace.

In conventional glass melting furnaces premixed glass-forming materials, sometimes termed batch materials, are fed onto the surface of a bath of molten glass contained in the furnace. The materials are melted by hot gases from flames playing across the furnace above the glass surface, or by heat produced by passing an electric current through the bath of molten glass between electrodes immersed in the glass. A combination of both heating methods may be employed.

Batch materials are conventionally fed to one end of a glass melting furnace and the molten glass passes through a refining zone where undissolved gases are removed, and a conditioning zone where the molten glass is cooled to a required temperature for feeding to a glass manufacturing process and is brought to the required homogeneity. The molten glass if fed from the furnace to a forming process, for example to a bushing from which glass fibres are drawn or to a flat glass forming process.

The melting, refining, and conditioning may be carried out in a continuous process in one furnace or the zones for melting, refining and conditioning may be separated from each other by walls, or throats. Melting, refining, and conditioning may take place in individual chambers joined by canals. Generally for continuous production of molten glass the quantity of raw materials fed to the process is so controlled as just to balance the amount of molten glass which is withdrawn for feeding to the glass-forming process.

2. Description of the Prior Art

Various ways have been proposed for insuring that the correct quantity of raw materials is fed to a glass melting furnace. Generally, these are based on an accurate measurement of the surface level of the molten glass at some predetermined position, and a signal generated from that measurement is used to control the rate of feeding of raw materials to the inlet end of the melting furnace. The weight of the melting furnace may be determined and adjustment made to the rate of feeding of raw materials to maintain a constant weight. A combination of these methods may be employed.

However, there are disadvantages in these methods. Firstly, the weighing of the melting stage of the furnace may provide accurate determination of the contents of the furnace and ensure accurate feeding of the raw materials, but does not ensure constant molten glass level in subsequent stages of the processing, and changes in the glass level would adversely influence the processing.

Furthermore, control of the rate of feeding of raw materials to the melting furnace by surface level measurement is not sufficiently sensitive since the surface area of the molten glass is generally large relative to its volume, and being remote from the actual melting area there will be time delays resulting in variation in feed rate, variation in temperature and variation in flow within the body of molten glass giving rise to gradual deterioration in glass quality.

It is a main objects of the present invention to overcome the disadvantages of the unknown ways of operating by providing an improved method and apparatus for controlling the rate of flow of molten glass from a reservoir, for example a glass melting furnace.

SUMMARY

The invention provides a method of and apparatus for controlling the rate of flow of molten glass from a reservoir, for example a glass melting furnace. Molten glass is continuously discharged from the reservoir to an intermediate vessel placed in the flow path of glass from the reservoir, and the temperature of the glass in the intermediate vessel is maintained at a value which is fixed in relation to the temperature of the glass discharging from the reservoir. The quantity of glass in the intermediate vessel is continuously determind by weighing the intermediate vessel, or by sensing any change in surface level, and a control signal representing any change in said quantity of glass in the intermediate vessel is generated and is employed to adjust the flow from the reservoir so as to maintain a predetermined rate of flow to the intermediate vessel.

The control signal may be employed to control the feed of material to the reservoir, or to control the rate of discharging of molten glass from the reservoir to the intermediate vessel. Molten glass is preferably fed directly from the intermediate vessel to a succeeding conditioner chamber and glass fibers are drawn from the molten glass in the chamber.

To account for temperature differences which might arise between the glass flowing into the intermediate vessel and the glass flowing out of that vessel, or to impose a desired temperature difference between the temperature of the glass discharging from the reservoir and the temperature of the glass in the intermediate vessle, there may be regulated heating of molten glass in the intermediate vessel which is adjusted according to any temperature difference measured between the glass in the proximity of the discharge from the reservoir and the glass in the intermediate vessel.

It has been found that for maximum sensitivity and optimum control of glass flow the intermediate vessel is preferably substantially smaller than the reservoir and than a chamber to which molten glass is fed from the intermediate vessel. Size of the intermediate vessel is dependant upon the total glass flow through the system.

The quantity of glass in the reservoir may be continously determined and a signal representative of that quantity provides coarse regulation of the feeding of molten glass or raw materials to the reservoir, while the control signal provides fine regulation of the feeding of molten glass or raw materials to the reservoir, The coarse regulation may be achieved by continuously weighing the reservoir or by measurement of the surface level of glass in the reservoir.

Load cells are preferred for weighing both the reservoir and the intermediate vessel in smaller scale plant, for example for the production of glass fibres.

For large capacity plants, for example for controlling the rate of flow of molten glass to a flat glass manufacturing process, such as the float process, surface level control may, in some circumstances, be preferred.

BRIEF DESCRIPTION OF THE DRAWINGS

Some embodiments of the invention will now be described, by way of example, with reference to the accompanying drawings, in which.

DESCRIPTION OF THE PREFERRED EMBODIMENTS

Figure 1:
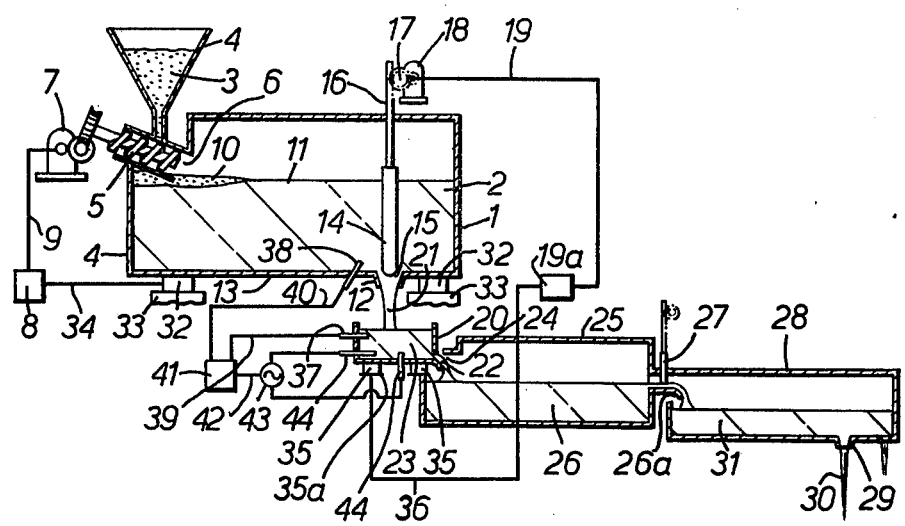
FIG. 1 is a schematic view partly in sectional elevation, of a glass melting furnace, a glass fining chamber, and a glass conditioning chamber from which glass fibres are drawn, with an intermediate vessel according to the invention positioned between the melting furnace and the fining chamber.

Referring to the drawings, FIG. 1 illustrates one embodiment of the invention for controlling the rate of flow of molten glass from a glass melting furnace 1 which contains a body of molten glass 2.

Pre-mixed glass-forming batch materials 3 are fed from a hopper 4 to a screw batch charger 5 which extends to an inlet 6 at one end of the furnace. The batch charger 5 is driven by a motor 7 whose speed is regulated by a recorder/controller 8, supplies from which are connected to the motor by lines indicated by the line 9. A blanket 10 of batch material forms on the surface 11 of the body of molten glass 2 contained in the furnace. The batch material in the blanket floats on the molten glass and reaction of the batch materials gradually takes place as the blanket moves along the surface of the molten glass to form the body of molten glass.

The rate of flow of molten glass from the furnace is regulated through an outlet orifice 12 which is formed in the floor 13 of the furnace at the end opposite the inlet 6. A tapered needle 14 of refractory material, for example platinum or molybdenum coated with a platinum alloy, extends vertically downwards through the molten glass to the orifice 12 which is shaped to form a seating for the shaped end 15 of the needle 14. The upper end of the needle 14 is fixed to the lower end of a rod 16 which has a helical thread, not shown, meshing with a pinion 17 which is driven by a motor 13 which receives a regulated supply on lines indicated by the line 19 connected to a speed and directional regulator 19a. The height of the tapered lower end 15 of the needle 14 relative to the orifice 12 is adjustable through regulation of the motor 18 to adjust the flow of glass from the body of molten glass 2 contained in the reservoir formed by the furnace 1.

An intermediate vessel 20 made of platinum or a platinum alloy, for example a platinum/rhodium alloy, is positioned beneath the orifice 12 to receive the regulated flow 21 of molten glass from the furnace. The intermediate vessel is of rectangular form and has an outlet 22 at one bottom edge from which molten glass 23 flows through an inlet 24 to a glass fining chamber 25 which contains a body of molten glass 26 which is refined during its residence in the chamber 25 by permitting escape of undissolved gases from the molten glass. The fined molten glass flows over a spout 26a, which flow is regulated by a tweel 27, into a feeder chamber 28 in which the glass is conditioned and which has bushings indicated at 29 in its floor.

Glass fibres 30 are drawn from the bushings 29 in conventional manner. The molten glass 31 in the feeder chamber is brought to the desired temperature and degree of homogeneity for the drawing of the glass fibres 30.

Load cells 32 are positioned beneath the floor of the furnace 1 and are seated on a massive rigid support frame indicated at 33. The load cells 32 continuously indicate the weight of the furnace and the molten glass which is contains and are responsive to any change in weight of the reservoir of molten glass constituted within the furnace 1, and transmit an output on lines indicated at 34 to the control means 8 for the screw batch feeder 5.

Similar load cells 35 are positioned beneath the floor of the intermediate vessel 20, and rest on a massive rigid support frame 35a. The load cells 35 indicate the weight of the intermediate vessel and its contents and hence continuously determine the quantity of glass in the intermediate vessel and generate a monitoring signal representing any change in that weight which signal is fed on lins indicated at 36 in FIG. 1 to the regulator 19a which regulates the height of the needle 14 and hence regulates the rate of flow of molten glass from the glass melting furnace to the intermediate vessel 20.

Signals generated by these load cells are employed to maintain a predetermined weight of glass 23 in the intermediate vessel, and as long as the temperature of the glass 23 in the intermediate vessel has a fixed relationship to the temperature of the glass 21 being discharged from the furnace 1, and provided that the size of the outlet 22 from the intermediate vessel is kept constant for any particular glass composition and flow range, any change in weight of the intermediate vessel, monitored by the load cells 35, will indicate a change in the flow of molten glass through the outlet 12 from the reservoir to the intermediate vessel.

The temperature of the glass 23 in the intermediate vessel is controlled by two thermocouples. One thermocouple 37 is mounted in a side wall of the intermediate vessel 20. The other thermocouple 38 is mounted at an angle through the floor 13 of the furnace so as to register the temperature of the glass as it is just flowing to the outlet from the surface. The thermocouples 37 and 38 may have platinum/rhodium functions mounted in molybdemum tubes.

The thermocouples 37 and 38 are connected by lines 39 and 40 to a detector 41 and the amplified signal from the detector 41 is fed on a line 42 to regulate a power source 43 which feeds two heating electrodes 44 which are mounted in the intermediate vessel, one through a side wall and the other through a floor. These electrodes 44, being spaced apart, constitute an electric heater in the intermediate vessel which is regulated through the agency of the thermocouples to maintain the temperature of the molten glass 23 in the intermediate vessel at the same temperature as or at a predetermined temperature different from the temperature of the molten glass flowing through the outlet 12. Usually a difference signal derived from the two thermocouples controls the power input to the electrodes from the power source 43.

Any change in weight of the intermediate vessel monitored by the load cells 35 is fed to the recorder-controller 19a which records that weight and controls the position of the needle 14 by operation of the motor 18.

In this embodiment therefore any change in the quantity of glass in the intermediate vessel 20 causes adjustment of the flow of glass from the furnace to the intermediate vessel, so as to maintain a predetermined rate of flow to the intermediate vessel, and therefore to maintain the accurate feeding of molten glass to the feeder chamber 28 from whch glass fibres are drawn.

Additionally, a signal derived from the load cells 35 beneath the floor of the intermediate vessel may be employed to provide fine control of the rate of feed of the batch materials to the inlet end of the furnace by the screw feeder 5.

The intermediate vessel 20 is positioned close to the outlet from the reservoir so that there is generally little change in temperature of the molten glass 21 as it flows into the intermediate vessel. Nevertheless the temperature regulation which has been described further enhances the more accurate regulation of the rate of flow of glass to the subsequent glass manufacturing process.

In the embodiment of FIG. 1 the intermediate vessel is substantially smaller than the reservoir.

The size of the intermediate vessel is however dependent upon the total glass flow through the system, and when for example the glass is flowing from the intermediate vessel to a flat glass manufacturing process, such as the float glass process for the manufacture of flat glass on a bath of molten metal, an intermediate vessel which is of larger capacity relative to the furnace than the vessel 20 of FIG. 1, may be desirable.

Figure 2:
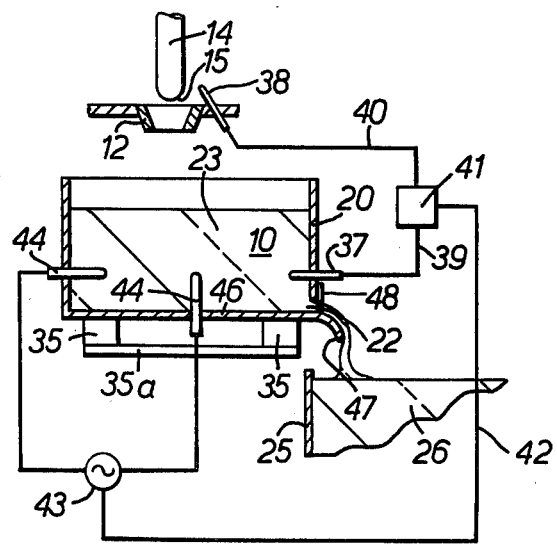
FIG. 2 is an enlarged view, partly in section, of the outlet from the melting furnace and the intermediate vessel.

The intermediate vessel 20 of FIG. 1 is illustrated in more detail in FIG. 2, which shows that the outlet aperture 22 from the intermediate vessel may be adjustable, although generally the size of the aperture is set for any particular operation. The floor 46 of the intermediate vessel 20 is shaped beneath the outlet 22 as a spout 47 above which there is mounted an adjustable tweel member 48 which is set to an aperture size giving the desired output flow of molten glass from the vessel 20 to the fining chamber 25.

Figure 3:
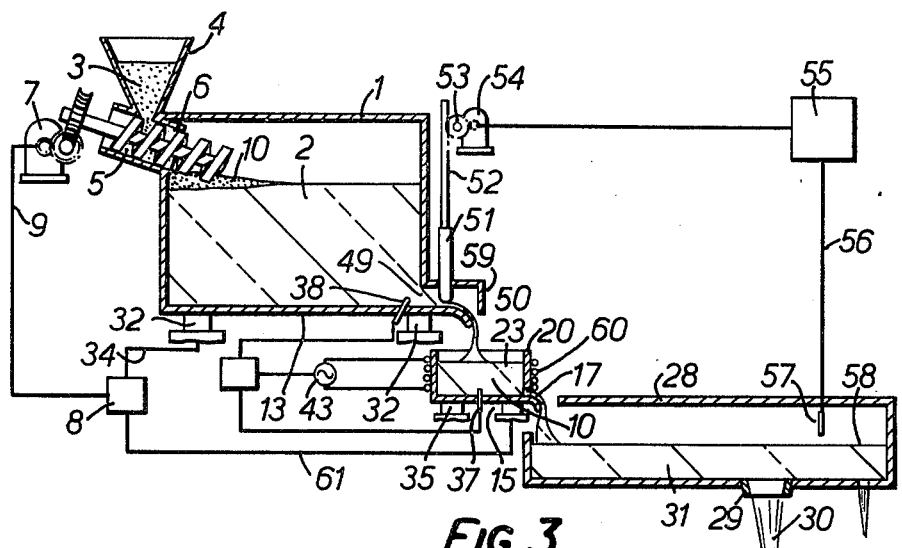
FIG. 3 is a view similar to FIG. 1 of apparatus which employs the arrangement of an intermediate vessel between a melting furnace and a feeder at the end of which glass fibres are drawn.

FIG. 3 illustrates a further modification of the apparatus of FIG. 1 in which the outlet from the glass melting furnace is not through an orifice formed in the floor of the furnace but is through a slot-shaped outlet 49 defined above a spout 50 which forms an extension of the floor 13 of the furnace at the outlet end. A tweel 51 is mounted vertically above the spout 50, on the lower end of an actuating rod 52 which has a helical thread which meshes with a pinion 53 driven through gearing by a motor 54 which receives a controlled supply through a recorder-controller 55 having an input on line 56 from a surface level detector 57 positioned at the surface level 58 of the body of molten glass 31 in a feeder chamber 28, which is fed directly from the intermediate vessel 20, and which has bushings indicated at 29 in its floor from which glass fibers 30 are drawn. The arrangement of the outlet from the furnace and the intermediate vessel of this embodiment are illustrated in more detail in FIG. 4.

The tweel 51 is adjustable vertically through a slot in a crown 59 mounted over the spout 50, the presence of which crown assists in preserving the temperature of the molten glass flow 21 from the spout to the body of molten glass 23 contained in the intermediate vessel 20. Instead of the heating electrodes 44 of the embodiment of FIG. 1, the molten glass in the intermediate vessel is heated by means of coiled heaters 60 which are coiled around the outer surface of the intermediate vessel 20 and rely on the thermal conductivity of the metal walls of that vessel to heat the body of molten glass. The heaters 60 are supplied from the power source 43 under control of the two thermocouples 37 and 38. The signals on line 34 from the load cells 32 beneath the furnace provide a relatively coarse control of batch feeding to the furnace while the signals on line 61 from the load cells 35 beneath the intermediate vessel provide a finer and more sensitive control of the batch feed superimposed on the coarse control.

The signal from the load cells 35 beneath the intermediate vessel may also be fed to the recorder-controller 55 to control the flow of glass from the outlet from the furnace to the intermediate vessel if a surface level detector such as the detector 57 is not employed. Using the surface level detector 57 as in FIG. 3 in the invention maintains the level of molten glass in the feeder 28 at a constant predetermined level by regulating the rate of flow of molten glass from the reservoir of molten glass in the furnace to the intermediate vessel.

Figure 4:
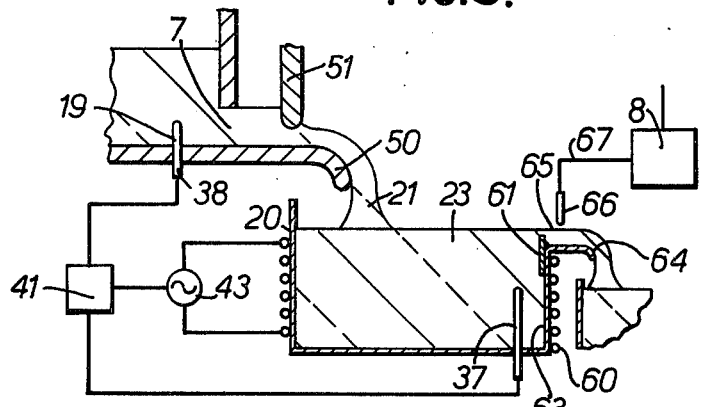
FIG. 4 is a view similar to FIG. 2 of a modified form of the intermediate vessel of FIG. 3.

In the embodiment of FIG. 4 the construction of the intermediate vessel with the tweel control of the outlet from the furnace is generally as illustrated in FIG. 3. The outlet from the intermediate vessel is by flow over an adjustable weir 61 mounted on a sidewall 63 of the intermediate vessel. Molten glass which flows over the weir 61 continues to flow over a spout 64 and falls from that spout onto the surface of the molten glass in the feeder chamber.

In this embodiment, instead of weighing the intermediate vessel by means of the load cells 35 beneath the intermediate vessel, the quantity of molten glass in the intermediate vessel is maintained by continuously monitoring the surface level 65 of the molten glass 23 by means of surface level detector 66 positioned just downstream of the weir 61. The output from the detector 66 on line 67 is fed to the controller 8 to provide fine control of the feed of batch material to the furnace.

Figure 5:
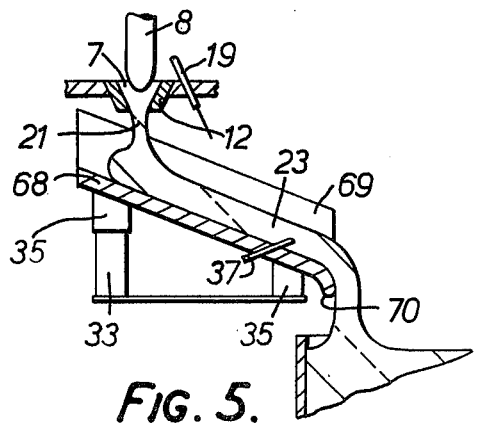
FIG. 5 is a view similar to FIGS. 2 and 4 of another form of intermediate vessel.

FIG. 5 illustrates another modification in which the intermediate vessel takes the form of an inclined plate 68 of refractory metal for example platinum or platinum/rhodium alloy. The plate 68 has sidewalls 69 which together define a channel down which there flows the molten glass 21 discharging through the orifice 12 from the furnace. The molten glass does not necessarily touch the side walls. The molten glass 23 flows over a lip 70 at the lower end of the plate and onto the molten glass in the succeeding chamber. The angle of inclination of the plate is adjustable and the plate rests on load cells 35 mounted on the massive frame 33 which supports the load cells.

The plate 68 may be heated by electrical heater coils attached to the plate. One of the thermocouples 37 is mounted in the plate 68 and extends at an angle into the flow of molten glass down the plate just before it reaches the lip 70. The slope of the plate is adjustable to ensure that a predetermined quantity of molten glass is supported by the plate, that is in effect the quantity of molten glass in the intermediate vessel.

A series of such plates mounted stepwise may be employed so that the molten glass flows in cascade over the series of plates all of which are weighed by means of load cells to provide the signal indicative of the quantity of molten glass in the cascade of molten glass over the plates.

A simple screw batch feeder has been described for feeding batch materials to the furnace, but it will be understood that any other conventional feeder may be employed and in particular a feeder arrangement which feeds both raw batch materials and cullet to the inlet to the furnace.

The outlet orifice from the intermediate chamber in each of the embodiments may be adjustable to accommodate different glass compositions or temperature ranges or different loads.

The invention is particularly applicable to the control of glass flow from a melting unit being used to produce molten glass for the production of glass fibres.

In one example of such operation of glass fibres 30 drawn from the bushings 29 are of a composition known as E glass. The temperature of the molten glass when drawn at the bushings is 1320° C, that is the temperature at which the viscosity of the glass is $10^3$ poises.

The invention ensures that the flow rate of molten glass is maintained constant from the intermediate vessel to the feeder chamber to ensure a constant glass level in the feeder chamber 28 from which the glass fibers are drawn. Because the control of flow takes place immediately at the outlet from the melting furnace, there is little time delay between the sensing of any change and the necessary correction to maintain the rate of flow which maintains the required constant glass level in the feeder chamber.

I claim:

1. A method of controlling the rate of continuous flow of molten glass from a reservoir, comprising a glass melting furnace, to a forming process, which method comprises feeding glass forming material into the furnace, discharging molten glass through an adjustable outlet from the furnace to an intermediate vessel, and discharging molten glass from an outlet in the intermediate vessel into a third vessel from which molten glass is removed for use in the forming process, said method further comprising sensing the temperature of the glass discharged from the outlet of the furnace, sensing the temperature of glass in the intermediate vessel and maintaining the temperature of the glass in the intermediate vessel at a value which is fixed in relation to the temperature of the glass discharging from the furnace, continuously determining the quantity of glass in the intermediate vessel, generating a control signal representing any change in said quantity of glass in the intermediate vessel, and employing that control signal to adjust the rate of flow of molten glass through the outlet from the furnace so as to maintain a predetermined rate of flow from the furnace to the intermediate vessel and thereby from the intermediate vessel to the third vessel.

2. A method according to claim 1, comprising employing the control signal to control the feed of material to the reservoir, 3. A method according to claim 1, comprising employing the control signal to control the rate of discharging of molten glass from the reservoir to the intermediate vessel.

4. A method according to claim 1, comprising feeding molten glass directly from the reservoir into the intermediate vessel positioned closely to the reservoir, and feeding molten glass directly from the intermediate vessel to a succeeding glass manufacturing stage at the same temperature as that at which the glass is discharged from the reservoir.

5. A method according to claim 1, comprising heating the molten glass in the intermediate vessel, and adjusting the amount of heat supplied in proportion to any temperature difference measured between the glass in the proximity of the discharge from the reservoir and the glass in the intermediate vessel.

6. A method according to claim 1, wherein the step of continuously determining the quantity of glass in the intermediate vessel is effected by weighing the intermediate vessel.

7. A method according to claim 1, comprising discharging molten glass from the reservoir to an intermediate vessel which is substantially smaller than the reservoir and then a chamber to which molten glass is fed from the intermediate vessel.

8. A method according to claim 7, comprising fining molten glass in the chamber to which molten glass flows from the intermediate vessel, then feeding the fined molten glass to a conditioner chamber, drawing glass fibres from the molten glass in the conditioner chamber, and regulating the flow of the molten glass to the intermediate vessel to a rate commensurate with the rate of drawing glass from the conditioner chamber into the glass fibres.

9. A method according to claim 7, comprising drawing glass fibres from molten glass in said chamber, and regulating the flow of molten glass to the intermediate vessel to a rate commensurate with the rate of drawing of glass from the chamber into the glass fibres.

10. A method according to claim 1, comprising continuously detemining the quantity of glass in the reservoir, employing a signal representative of that quantity to provide coarse regulation of the feeding of molten glass or raw materials to the reservoir, and employing said control signal to provide a fine regulation of the feeding of molten glass or raw materials to the reservoir.

11. A method according to claim 10, wherein the coarse regulation is achieved by continuously weighing the reservoir.

12. A method of controlling the rate of flow of molten glass from a reservoir, for example a glass melting furnace, comprising continuously discharging molten glass from a reservoir to an intermediate vessel placed in the flow path of glass from the reservoir, maintaining the temperature of the glass in the intermediate vessel at a value which is fixed in relation to the temperature of the glass discharging from the reservoir, continuously determining the quantity of glass in the intermediate vessel, generating a control signal respresenting any change in said quantity of glass in the intermediate vessel, employing that control signal to adjust the flow from the reservoir so as to maintain a predetermined rate of flow to the intermediate vessel, discharging molten glass from the intermediate vessel to a further chamber, continuously monitoring the surface level of the molten glass in that further chamber, generating a signal indicative of any change in that surface level, and using that signal to regulate the flow of molten glass from the reservoir to the intermediate vessel and thereby to maintain the surface level in said chamber substantially constant.

13. A method according to claim 12, comprising fining molten glass in the chamber, to which molten glass flows from the intermediate vessel, then feeding the fined molten glass to a conditioner chamber, drawing glass fibres from the molten glass in the conditioner chamber, and regulating the flow of molten glass to the intermediate vessel to a rate commensurate with the rate of drawing glass from the conditioner chamber into the glass fibres.

14. A method according to claim 12, comprising drawing glass fibres from molten glass in said further chamber, and regulating the flow of molten glass to the intermediate vessel to a rate commensurate with the rate of drawing the glass from the chamber into the glass fibres.

15. Apparatus for controlling the rate of flow of molten glass to a glass forming process, which apparatus comprises a glass melting furnace having adjustable feeding means for feeding material to the furnace, flow control means for regulating the rate of flow of molten glass through an outlet from the furnace, means for determining the quantity of glass in the furnace and first temperature sensing means for sensing the temperature of the molten glass discharged from the outlet of the furnace, and an intermediate vessel positioned to receive molten glass discharged from the outlet of the furnace, said intermediate vessel having an outlet for discharging molten glass, second temperature sensing means for sensing the temperature of molten glass in the intermediate vessel and heating means for maintaining the temperature of glass in the intermediate vessel at a value which is fixed in relation to the temperature of the glass discharged from the furnace, and a third vessel arranged to receive molten glass from the outlet in the intermediate vessel, monitoring means being provided and arranged to continuously determine the quantity of glass in the intermediate vessel and generate a signal representing any charge in that quantity, the monitoring means being connected to said adjustable feeding means thereby to adjust the flow of molten glass from the furnace.

16. Apparatus for controlling the rate of flow of molten glass to a glass forming process, which apparatus comprises a glass melting furnace having adjustable feeding means for feeding material to the furnace, flow control means for regulating the rate of flow of molten glass through an outlet from the furnace, means for determining the quantity of glass in the furnace and first temperature sensing means for sensing the temperature of the molten glass discharged from the outlet of the furnace, and an intermediate vessel positioned to receive molten glass discharged from the outlet of the furnace, said intermediate vessel having an outlet for discharging molten glass, second temperature sensing means for sensing the temperature of molten glass in the intermediate vessel and heating means for maintaining the temperature of glass in the intermediate vessel at a value which is fixed in relation to the temperature of the glass discharged from the furnace, and a third vessel arranged to receive molten glass from the outlet in the intermediate vessel, monitoring means being provided and arranged to continuously determine the quantity of glass in the intermediate vessel and generate a signal representing any change in that quantity, the monitoring means being connected to said flow control means to adjust the rate of flow of molten glass through the outlet from the furnace.

17. Apparatus according to claim 15, comprising at least one load cell mounted beneath the reservoir and responsive to any change in weight of the reservoir, an output from the cell being connected to said adjustable feeding means which is operable to govern the rate of feeding of batch materials or glass to the reservoir.

18. Apparatus according to claim 16, wherein a surface level detector is mounted in the intermediate vessel and is connected to the flow control means, the detector including means for generating a flow control signal for feeding to said flow control means.

19. Apparatus according to claim 15, comprising at least one load cell mounted beneath the intermediate vessel and responsive to any change in weight of the intermediate vessel, and an output from the load cell connected to said adjustable feeding means.

20. Apparatus according to claim 16, comprising at least one load cell mounted beneath the intermediate vessel and responsive to any change in weight of the intermediate vessel and an output from the load cell connected to said flow control means.

21. Apparatus according to claim 16, wherein said flow control means comprises a tweel operating in a canal leading from the outlet from the reservoir to the intermediate vessel.

22. Apparatus according to claim 16, wherein said flow control means comprises a tapered needle whose height is adjustable in an orifice formed in the base of the reservoir.

23. Apparatus according to claim 15, wherein said intermediate vessel is made from platinum or a platinum alloy.

24. Apparatus according to claim 15, wherein said heating means comprises an electric heater in the intermediate vessel, a thermocouple is fixed in the intermediate vessel to measure glass temperature, and a thermocouple is fixed in the reservoir near the outlet, the thermocouples being connected to temperature monitoring means connected to means controlling the supply to the electric heater.

* * * * *